(12) United States Patent
Nevala et al.

(10) Patent No.: US 12,134,850 B2
(45) Date of Patent: Nov. 5, 2024

(54) FEED DEVICE, PLANAR WASHING MACHINE AND METHOD

(71) Applicant: 24 Pesula Oy, Kokkola (FI)

(72) Inventors: Jukka Nevala, Kokkola (FI); Veli-Pekka Nevala, Kokkola (FI)

(73) Assignee: 24 Pesula Oy, Kokkola (FI)

( * ) Notice: Subject to any disclaimer, the term of this patent is extended or adjusted under 35 U.S.C. 154(b) by 257 days.

(21) Appl. No.: 17/904,689

(22) PCT Filed: Feb. 19, 2021

(86) PCT No.: PCT/FI2021/050119
§ 371 (c)(1),
(2) Date: Aug. 19, 2022

(87) PCT Pub. No.: WO2021/165579
PCT Pub. Date: Aug. 26, 2021

(65) Prior Publication Data
US 2023/0103848 A1 Apr. 6, 2023

(30) Foreign Application Priority Data
Feb. 21, 2020 (FI) .................... 20205180

(51) Int. Cl.
| | | |
|---|---|---|
| *D06F 11/00* | (2006.01) | |
| *B65G 39/16* | (2006.01) | |
| *D06F 17/04* | (2006.01) | |
| *D06F 33/30* | (2020.01) | |
| *D06F 34/20* | (2020.01) | |
| *D06F 39/00* | (2024.01) | |

(Continued)

(52) U.S. Cl.
CPC .............. *D06F 11/00* (2013.01); *B65G 39/16* (2013.01); *D06F 17/04* (2013.01); *D06F 33/30* (2020.02); *D06F 34/20* (2020.02); *D06F 39/00* (2013.01); *B65G 2201/022* (2013.01); *B65G 2203/0283* (2013.01); *D06F 2103/00* (2020.02); *D06F 2105/00* (2020.02)

(58) Field of Classification Search
CPC ........... D06F 11/00; D06F 31/00; D06F 67/04
See application file for complete search history.

(56) References Cited

U.S. PATENT DOCUMENTS

| | | |
|---|---|---|
| 3,123,994 A | 3/1964 | Brown et al. |
| 3,785,542 A | 1/1974 | Edes et al. |

(Continued)

FOREIGN PATENT DOCUMENTS

| | | |
|---|---|---|
| EP | 3315645 | 5/2018 |
| FR | 2677673 | 12/1992 |

(Continued)

OTHER PUBLICATIONS

"PCT Application No. PCT/FI2021/050119 International Search Report and Written Opinion", Aug. 26, 2021, 11 pages.

*Primary Examiner* — Spencer E. Bell
(74) *Attorney, Agent, or Firm* — DeLizio, Peacock, Lewin & Guerra, LLP

(57) ABSTRACT

A feed device, planar washing machine and method. The feed device (15) comprises roll arrangement (21) provided with support rolls (16, 17) and an alignment roll (18). An endless belt (13) is arranged around the rolls. The alignment roll can be moved (C) in order to guide the feed belt to move into desired direction when it is moved laterally.

13 Claims, 4 Drawing Sheets

(51) Int. Cl.
*D06F 105/00* (2020.01)
*D06F 103/00* (2020.01)

(56) References Cited

U.S. PATENT DOCUMENTS

| | | | | |
|---|---|---|---|---|
| 4,031,639 | A * | 6/1977 | McCabe | D06F 67/04 38/143 |
| 2015/0361610 | A1 * | 12/2015 | Yano | B66C 1/58 38/143 |
| 2018/0148287 | A1 * | 5/2018 | Maeshima | B65H 5/085 |
| 2019/0352840 | A1 | 11/2019 | Bringewatt et al. | |
| 2020/0165763 | A1 * | 5/2020 | Kim | D06F 31/00 |

FOREIGN PATENT DOCUMENTS

| | | |
|---|---|---|
| JP | S59133150 | 7/1984 |
| WO | 2021165579 | 8/2021 |

\* cited by examiner

FEED DEVICE, PLANAR WASHING MACHINE AND METHOD

BACKGROUND OF THE INVENTION

The invention relates to a feed device for planar textile processing machines.

The invention further relates to a planar washing machine and to a method of feeding rugs and carpets in the washing machine.

The field of the invention is defined more specifically in the preambles of the independent claims.

Planar washing machines have been developed for washing different kind of planar textile products. Such machines are used for example in self-service laundromats. The machines are provided with feed systems configured to feed the textile products inside the machine. The present solutions have shown some disadvantages regarding the feeding and alignment of the textile products.

BRIEF DESCRIPTION OF THE INVENTION

An object of the invention is to provide a novel and improved feed device and a solution for feeding separate textile products inside a planar washing machine.

The feed device according to the invention is characterized by the characterizing features of the first independent apparatus claim.

The planar washing machine according to the invention is characterized by the characterizing features of the second independent apparatus claim.

The method according to the invention is characterized by the characterizing features of the independent method claim.

An idea of the disclosed solution is that a feed device is mountable in connection with a feed opening of a textile processing machine, which machine is designed for treating separate planar textile products. Purpose of the feed device is to transport the textile product on the feed device during the treating process. The feed device is provided with a roll arrangement comprising several rotating rolls. The roll arrangement comprises parallel first and second support rolls and an alignment roll arranged below the support rolls. Thus, the roll arrangement may comprise three rolls. The alignment roll is adjustable in a horizontal direction. Further, an endless feed belt is arranged around the rolls of the roll arrangement. Direction of the alignment roll relative to the support rolls is adjustable in order to adjust lateral position of the feed belt on the roll arrangement. The alignment roll may also be called as an adjusting roll.

In other words the alignment or adjusting roll can be moved to a slightly skewed position so that it generates a guiding effect or force for the feed belt which then begins to move towards a desired direction transverse to the feed direction. The skewed position can be achieved by moving the opposite ends of the alignment roll into opposite directions or by moving one of the ends relative to another end.

When the feed belt moves laterally, the textile product on it moves to the same direction, of course.

An advantage of the disclosed solution is that the feed device with the feed belt may provide proper support for the textile product and also ensures generation of sufficient friction between the textile product and the feed device. Further, the structure of the feed device is simple, inexpensive and durable.

Let it be mentioned that the textile processing machine may be a planar washing machine or any other machine for treating planar textile products.

According to an embodiment, the feed device comprises at least one adjusting actuator at both ends of the alignment roll for executing the adjusting movements.

According to an embodiment, the mentioned two adjusting actuators can be controlled independently.

According to an embodiment, the feed device comprises an adjusting actuator only at one end of the alignment roll for executing the adjusting movements. It may be sufficient to move only one end of the alignment roll relative to its opposite end.

According to an embodiment, the one or more adjusting actuators are pressure medium operated actuators.

According to an embodiment, the one or more adjusting actuators are pneumatic cylinders.

According to an embodiment, the one or more adjusting actuators are electrical actuators, such as electrical linear motors. The actuator may also be a rotating motor connected by means of gear, toothed rack system or other transmission means to move the end of the alignment roll.

According to an embodiment, the feed device is provided with at least one edge sensing device for detecting at least one longitudinal edge of the feed belt.

According to an embodiment, the edge sensing device is a contactless sensing device and is configured to send and receive sensing signals. The contact-free sensing device is configured to send detection signals towards the longitudinal edge of the fed belt and the signals reflect back when they are detected. This way the arrangement utilizes non-contacting measurement principle. Thus, the longitudinal edge may be detected by using remote sensing techniques. The remote sensing system may comprise ultrasonic sensors or laser sensors, for example. Also cameras and other optical systems may be used to detect the monitored edges.

According to an embodiment, the feed device comprises at least one nip roll arranged above the roll arrangement and configured to be vertically movable relative to the feed belt and the textile product supportable on the feed belt. In other words, the nip roll presses the textile product against an outer surface of the feed belt and thereby increases friction between them thus ensuring proper feeding. The nip roll and the feed belt arrangement may operate in co-operation. The nip roll is an idle roll intended to increase friction forces and the feed belt provides the traction forces and support.

According to an embodiment, nip pressure between the nip roll and the feed belt is adjustable by moving the nip roll in relation to the feed belt.

According to an embodiment, the feed device comprises at least one motor connected by means of at least one bendable transmission element to at least one of the support rolls. The alignment roll and the nip roll are idle rolls without a connection to the transmission element.

According to an embodiment, the motor is an electric motor.

According to an embodiment, the bendable transmission element is a roller chain or a drive belt.

According to an embodiment, rotation movement of the motor is transmitted to both support rolls, whereby both support rolls are traction rolls.

According to an embodiment, the roller arrangement has triangular configuration wherein the first support roll, the second support roll and the alignment roll are located at apexes of the tringle.

According to an embodiment, distance between rotation axis of the first support roll and the second support roll is 200-500 mm and width of the feed belt is at least 1000 mm. Thereby the feed belt is a relatively short and wide piece.

According to an embodiment, width of the feed belt is 1500-2500 mm.

According to an embodiment, the feed belt is made of polymer material. The structure may also comprise reinforcing elements, such as threads or fibers.

According to an embodiment, the feed device comprises support elements at both end portions of the adjusting roll. The support element comprises a longitudinal opening provided with horizontally directed support surfaces configured to guide adjusting movement of the alignment roll. A rotation axle of the alignment roll is supported to the horizontal linear support surfaces. Then adjusting movement of the roll can be controlled and accurate.

According to an embodiment, only one end of the alignment roll is provided with the above mentioned support element. In this embodiment only one end of the alignment roll is turned in the horizontal direction.

According to an embodiment, the alignment roll is without any vertical movement.

According to an embodiment, the solution relates to a planar washing machine for washing separate planar textile products. The washing machine may comprise: a standing body configured to be mounted on a floor; a feed opening for feeding the textile product into the washing machine; a feed device, which is located at the feed opening and is configured to feed the textile product in a feed direction towards the washing machine and inside the washing machine during the operation. The feed device comprises a feed belt for supporting and feeding the textile product. The feed device further comprises an alignment system for adjusting lateral position of the feed belt. The feed device is in accordance with the features and embodiments disclosed in this document.

According to an embodiment, the alignment system of the washing machine comprises adjusting actuators configured to move ends of an alignment roll of the alignment system. The mentioned adjusting actuators are located outside an inner washing space limited laterally by means of side plates of the body. An advantage of this solution is that the adjusting actuator is protected against moisture and dirt when they are located outside a washing space or zone. Then service life of the adjusting actuators may be longer. Further, maintenance of the adjusting system is facilitated due to easy accessibility.

According to an embodiment, the washing machine comprises at least one control unit for controlling operation of the washing machine. The control unit is configured to automatically control operation of the adjusting actuators for keeping the feed belt continuously at a predetermined transverse position.

According to an embodiment, the feed device comprises at least one edge sensing device mounted to the body of the washing machine and configured to monitor a longitudinal edge of the feed belt continuously during the operation of the washing machine.

According to an embodiment, the solution relates to a method of controlling feeding of separate planar textile products in a planar washing machine. The method may comprise: feeding initially an end of the textile product manually into a feed opening; holding the textile product by means of a holding device before an automatic washing process is initiated; and feeding the textile product in a feed direction with a feed device during the washing process. The method further comprises using a feed device which comprises at least two support rolls, an alignment roll and an endless feed belt surrounding the rolls. Sensing data on position of a longitudinal edge of the feed belt is generated by means of at least one edge sensing device and direction of the alignment roll is adjusted in response to the sensing data. A control unit of the machine may automatically execute the needed adjusting measures.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
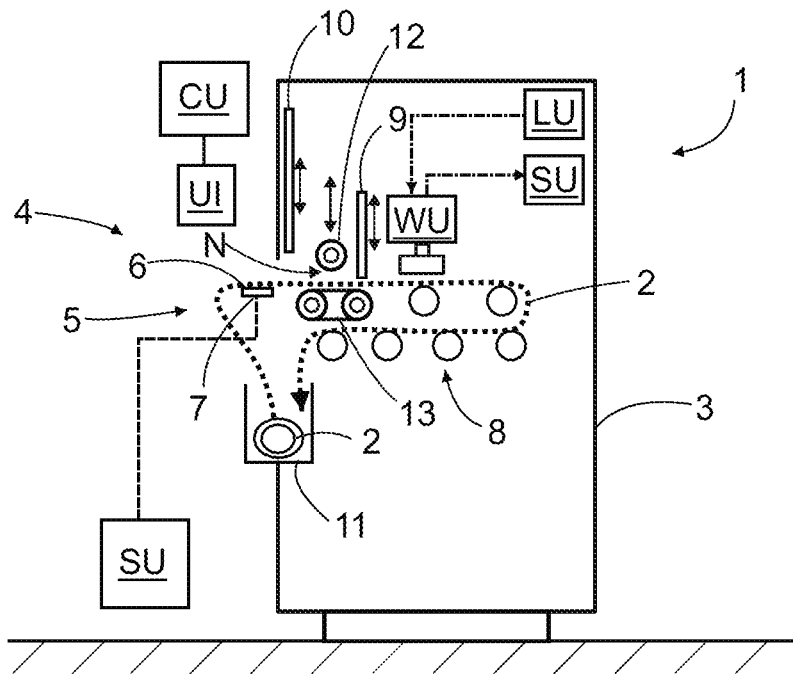
FIG. 1 is a schematic side view of a planar washing machine.

FIG. 1 shows a planar washing machine 1 for washing planar textile products 2 such as rugs or similar furnishing textiles. The washing machine 1 comprises a body 3. The textile product 2 may be fed into the washing machine 1 through a feed opening 4 wherein it is taken over by gripping means 5. The gripping means 5 may comprise one or more holding devices 6 which may include suction ports 7. An underpressure or suction may be led to the suction ports 7 from a suction unit SU or source. The washing machine further comprises feeding means 8, such as rollers, by means of which the textile product 2 may be moved forward in the washing machine 1. In the vicinity of the feed opening 4 there may be a transverse stopper 9 against which a leading end of the textile product 2 is at first fed manually. The stopper 9 may be a mechanical member that may be adapted to be moved in the vertical direction so that it may be moved out of the way of the textile product 2 when the washing cycle is started.

The actual washing may be performed by means of a washing unit WU. The washing unit WU may comprise one or more washing nozzles and two or more suction heads. Washing agent or washing liquid is fed with high pressure from a washing liquid unit LU, and a drying suction may be formed with a suction unit or source SU.

The operation of the washing machine 1 may be controlled by a control unit CU. The control unit CU may automatically control the suction of the holding device 6, a hatch 10, feeding or transfer means 8, washing unit WU and generally the entire work cycle of the washing machine 1. As it is disclosed above in this document, the control unit may control also an alignment system.

The washing machine 1 washes the rug with the aid of one or more washing agent jets and two or more rotating suction heads. The washing agent used in the washing is water to which washing agent may have been mixed. Further, the washing machine 1 sucks off the water left in the rug after the washing, drying the rug so that when the rug is taken out of the washing machine, no water will run out of it and it will dry fast. The disclosed washing machine 1 may be installed in a launderette where the customers themselves use the washing machine.

FIG. 1 further shows that the feed opening 4 is provided with a nip N provided with a movable nip roll 12 and a short transfer or feed belt 13 below the feed line. The nip roll 12 is pressed against the upper surface of the textile product 2 and the feed belt 13 is driven for moving the textile product 2 further inside the machine 1.

Figure 2:
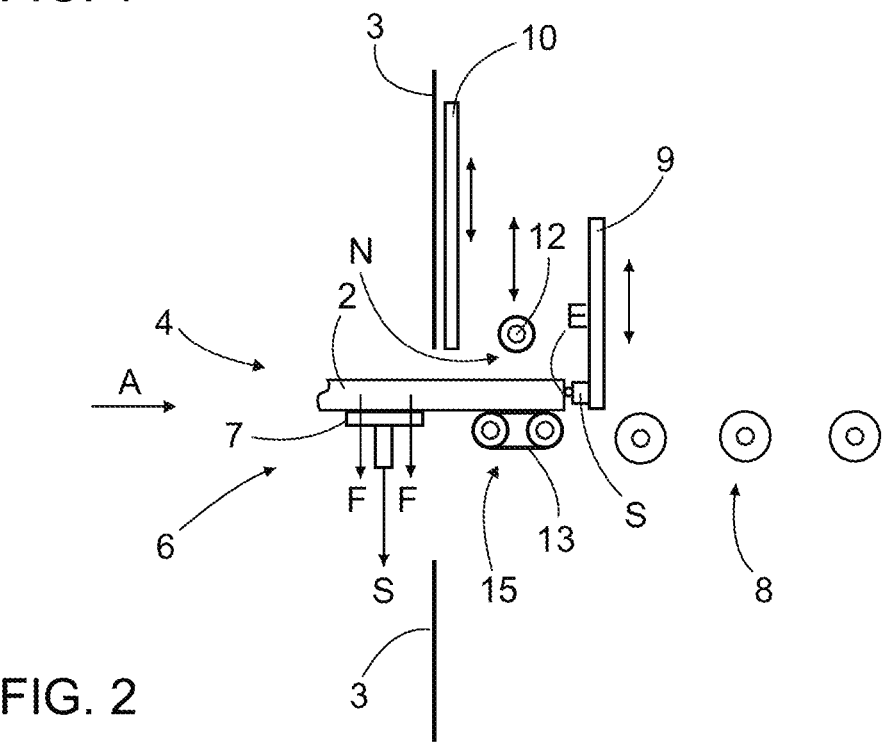
FIG. 2 is a schematic view of a feed opening of a machine when a textile product is manually positioned.
Figure 3:
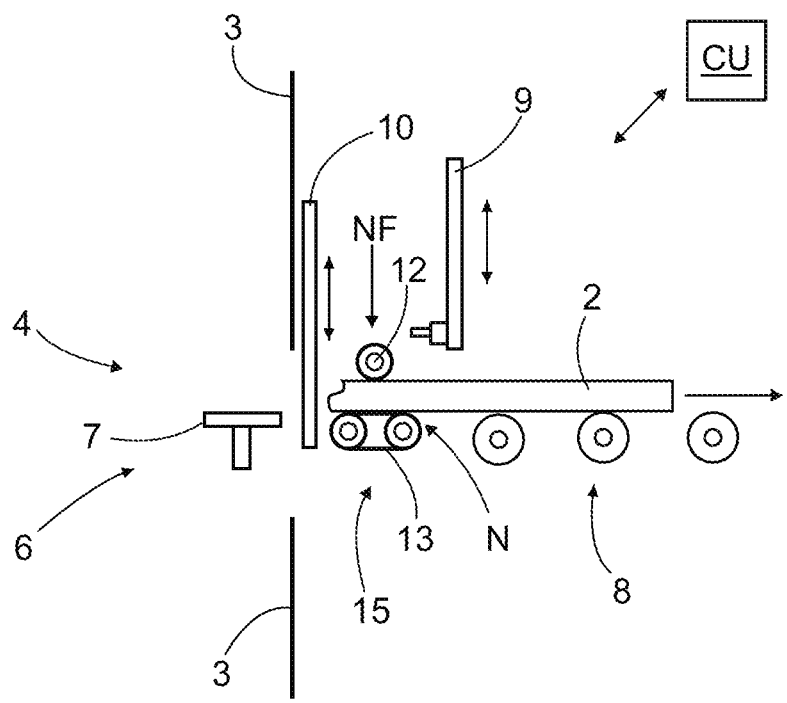
FIG. 3 is a schematic view of the feed opening disclosed in FIG. 2 after the manual feed process is completed and a washing process is initiated.

FIG. 2 discloses that a textile product 2 is fed manually against a stopper 9, which is moved to its lower position. After a leading edge E of the textile product 2 is sensed and its positioning and straightness is accepted by a control unit CU, the holding device 6 is actuated and suction S is directed to suction ports 7. The suction causes vacuum force F which keeps the textile product immovable. Manual grip can be removed and the user can take his hands out of the feed opening 4. Thereafter, the stopper 9 moves away, a hatch 10 closes and nip roll 12 is moved against the textile product 2 thus producing desired nip force NF in the nip N. A feed belt 13 is then activated and the textile product 2 may be transferred in the feed direction A. This is disclosed in FIG. 3. The feed belt 13 and the nip roll 12 are part of a feed device 15.

However, in some cases the nip roll 12 can be left out or it may be substituted with another overhead transport or pressing element.

Figure 4:
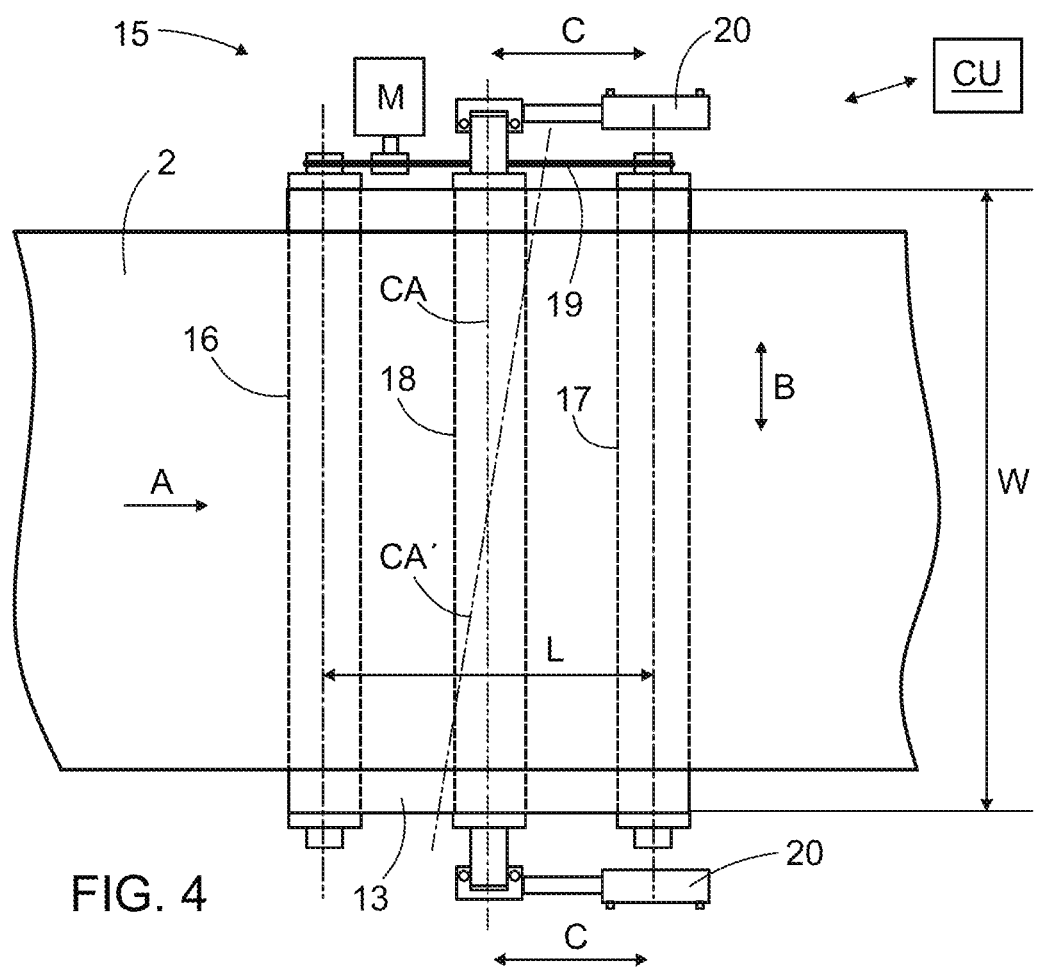
FIG. 4 is a schematic top view of a feed device for moving a textile product.

FIG. 4 discloses that a textile product 2 is fed manually in a feed direction A by means of a feed device 15 comprising a feed belt 13. The feed belt 13 is arranged to be driven around a first support roll 16, a second support roll 17 and an alignment roll 18. One or both of the support rolls 16 and 17 may be driven by a motor M and a bendable transmission element 19. The alignment roll 18 may be a freely rotating idle roll. Distance L between the support rolls 16, 17 may be relatively short whereby also length of the feed belt 13 is short too. However, width W of the feed belt 13 is multiple relative to the length L.

Ends of the alignment roll 18 can be moved C in horizontal direction by means of adjusting actuators 20, which may be pneumatic cylinders, for example. Thereby it is possible to skew the alignment roll 18 so that its central axis CA moves to skewed position CA'.

Figure 5:
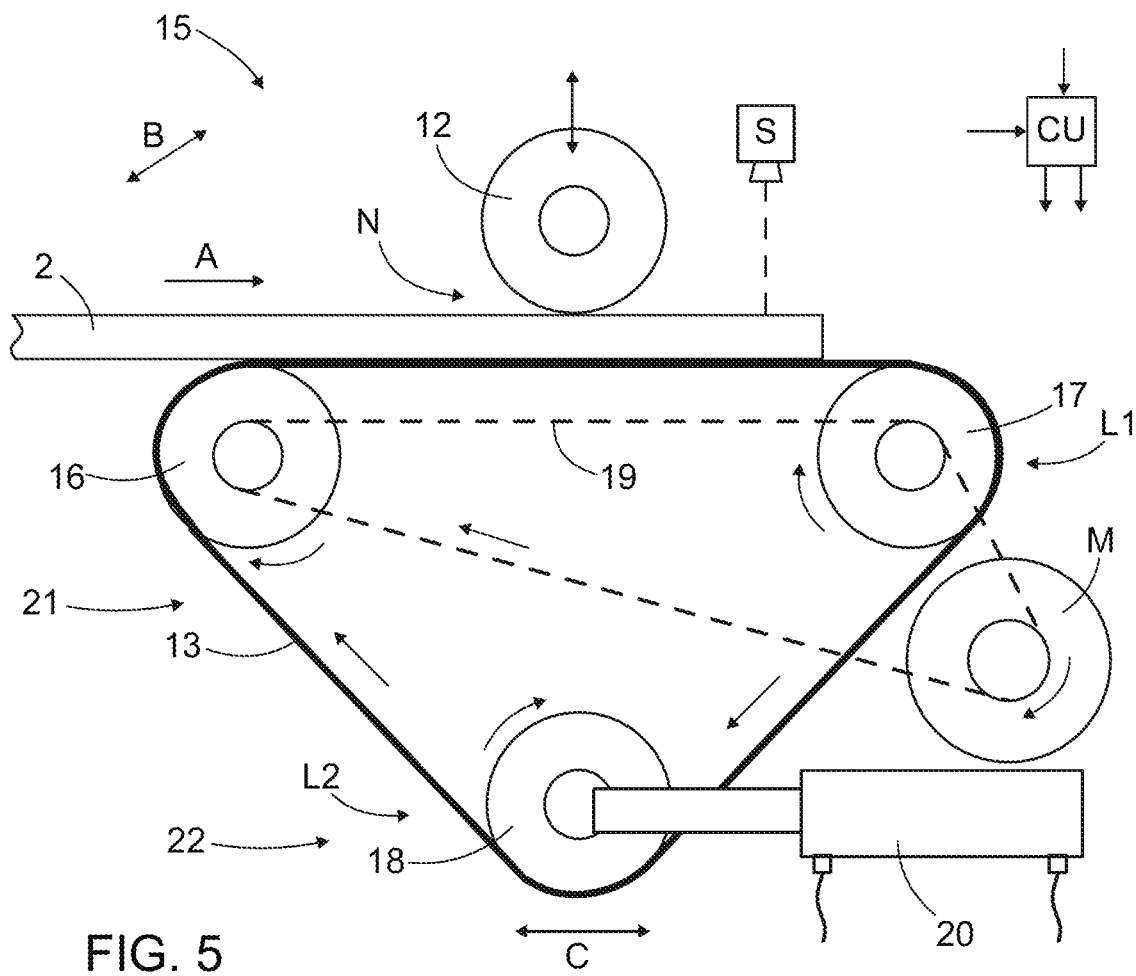
FIG. 5 is a schematic side view of a feed device and an edge sensing system.

FIG. 5 discloses a feed device 15 which corresponds to the one shown in FIG. 4. The feed device 15 comprises a roll arrangement 21 provided with the support rolls 16, 17 at a first level L1 and the alignment roll 18 at a lower second level L2. Thereby, the rolls 16-18 are arranged to form a triangular configuration.

FIG. 5 further discloses that there is an edge sensing device S for monitoring longitudinal edge of the textile product 2. Produced sensing data is transmitted to a control unit and the control unit CU may control the adjusting actuator 20 for moving C the alignment roll 18 relative to the support rolls 16, 17. An alignment system 22 may be as it is discussed in more detailed above in this document.

Figure 6:
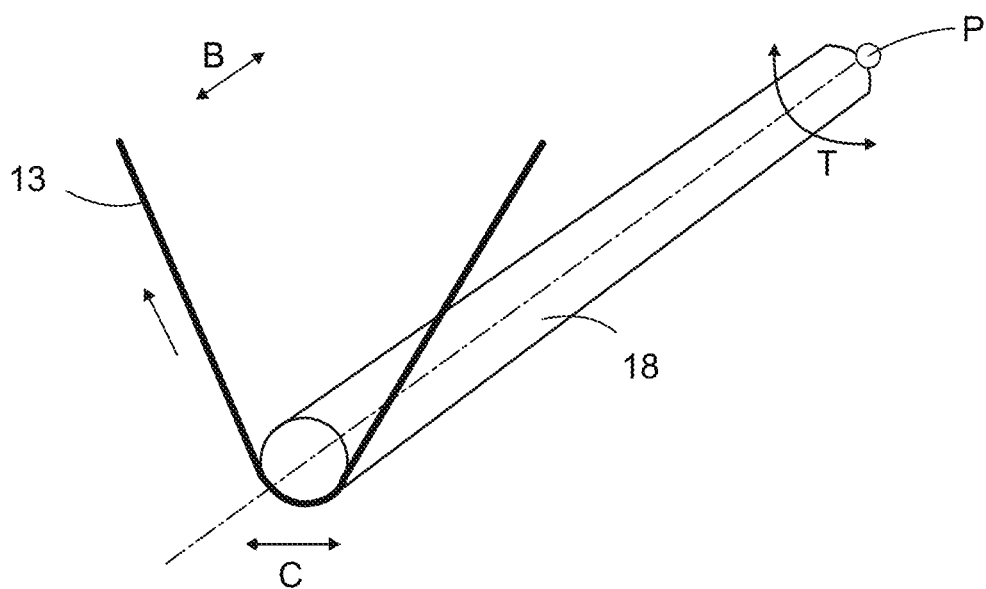
FIG. 6 is a schematic and highly simplified view of a principle of the disclosed alignment by means of an alignment roll.

FIG. 6 discloses a possible alternative solution to the one shown in FIGS. 4 and 5. In this embodiment only one end of an alignment roll 18 is moved C in relation to a turning point P or fulcrum which is located at an opposite end. In other words, the opposite may be provided with a hinge or other element for allowing turning T of the alignment roll 18.

Figure 7:
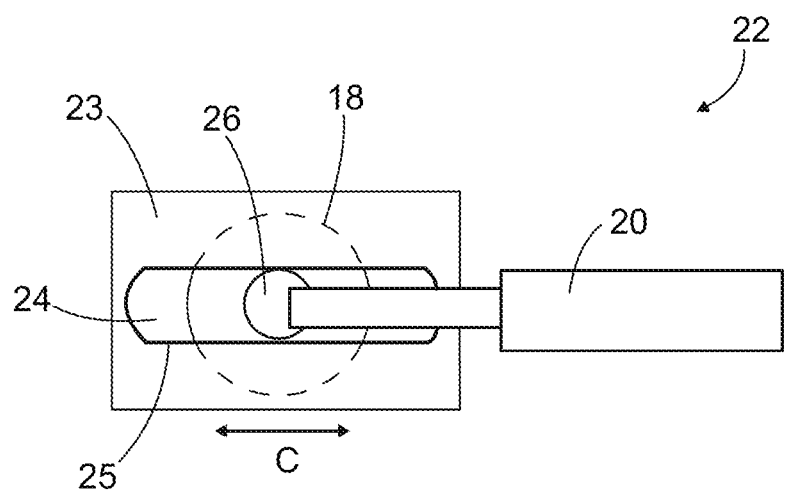
FIG. 7 is schematic a side view of a support element providing linear guiding for an end of an alignment roll in a horizontal direction.

FIG. 7 discloses a support element 23 for supporting an end of an alignment roll 18 and guiding its movement C in a horizontal direction when being skewed by means of an adjusting actuator 20. The support element 23 comprises an elongated hole 24 provided with linear guide surfaces 25 against which the end 26 of the roll 18 can be supported. The end 26 may be provided with suitable bearing and other elements.

The drawings and the related description are only intended to illustrate the idea of the invention. In its details, the invention may vary within the scope of the claims.

The invention claimed is:

1. A feed device of a textile processing machine for treating separate planar textile products, wherein the feed device is configured to support and transport the separate planar textile products on the feed device, wherein the feed device comprises
   a roll arrangement comprising,
      a first support roll and a second support roll which are arranged parallel on a first level;
      an alignment roll arranged on a second level below the first level and being movable in a horizontal direction;
   an endless feed belt arranged around the first support roll, the second support roll, and the alignment roll of the roll arrangement;
   wherein direction of the alignment roll relative to the first and second support rolls is adjustable in order to adjust lateral position of the endless feed belt on the roll arrangement;
   and wherein a width of the endless feed belt is a multiple relative to distance between the first and second support rolls.

2. The feed device as claimed in claim 1, wherein the feed device comprises at least one adjusting actuator at both ends of the alignment roll for executing the adjusting movements.

3. The feed device as claimed in claim 1, wherein the feed device is provided with at least one edge sensing device for detecting at least one longitudinal edge of the endless feed belt.

4. The feed device as claimed in claim 1, further comprising:
   at least one nip roll arranged above the roll arrangement and configured to be vertically movable relative to the endless feed belt and the separate planar textile products supportable on the endless feed belt.

5. The feed device as claimed in claim 1, further comprising:
   at least one motor connected by means of at least one bendable transmission element to at least one of the first support roll and the second support roll.

6. The feed device as claimed in claim 1, wherein the roll arrangement has triangular configuration wherein the first support roll, the second support roll and the alignment roll are located at apexes of a triangle.

7. The feed device as claimed in claim 1, wherein distance between rotation axis of the first support roll and the second support roll is 200-500 millimeters (mm) and width of the endless feed belt is at least 1000 mm.

8. The feed device as claimed in claim 1, further comprising:
   support elements at both end portions of the alignment roll, wherein each support element is provided with a longitudinal opening provided with horizontally directed support surfaces configured to guide adjusting movement of the alignment roll.

9. A planar washing machine for washing separate planar textile products, and wherein the planar washing machine comprises:
- a standing body configured to be mounted on a floor;
- a feed opening for feeding the separate planar textile products into the planar washing machine;
- a feed device, which is located at the feed opening and is configured to feed the separate planar textile products in a feed direction towards the planar washing machine using a feed belt, wherein the feed device comprises an alignment system to adjust a lateral position of the feed belt; and
- at least one washing unit for washing the separate planar textile products inside the planar washing machine,
- wherein the feed device comprises a roll arrangement comprising,
  - a first support roll and a second support roll which are arranged parallel on a first level; and
  - an alignment roll arranged on a second level below the first level and being movable in a horizontal direction, wherein the feed belt is arranged around the roll arrangement, wherein a width of the feed belt is a multiple relative to distance between the first and second support rolls.

10. The planar washing machine as claimed in claim 9, wherein the alignment system comprises adjusting actuators configured to move ends of the alignment roll, and wherein the adjusting actuators are located outside an inner washing space limited laterally by means of side plates of the body.

11. The planar washing machine as claimed in claim 10, further comprising:
- at least one control unit for controlling operation of the planar washing machine, wherein the at least one control unit is configured to automatically control operation of the adjusting actuators for keeping the feed belt continuously at a predetermined transverse position.

12. The planar washing machine as claimed in claim 9, wherein the feed device comprises at least one edge sensing device mounted to the body of the planar washing machine and configured to monitor a longitudinal edge of the feed belt during the operation of the planar washing machine.

13. A method of controlling feeding of separate planar textile products in a planar washing machine; wherein the method comprises:
- feeding initially an end of the separate planar textile products manually into a feed opening;
- holding the separate planar textile products by means of a holding device before an automatic washing process is initiated; and
- feeding the separate planar textile products in a feed direction with a feed device during the washing process, wherein the feed device comprises at least two support rolls, an alignment roll and an endless feed belt surrounding the at least two support rolls, wherein the endless feed belt has a width that is a multiple relative to a distance between the at least two support rolls;
- detecting, using at least one sensing device, sensing data at a position that is on a longitudinal edge of the endless feed belt;
- and
- adjusting direction of the alignment roll in response to the sensing data.

* * * * *